E. H. SMITH.
Sewing Machine.
No. 20,175.
Patented May 4, 1858.
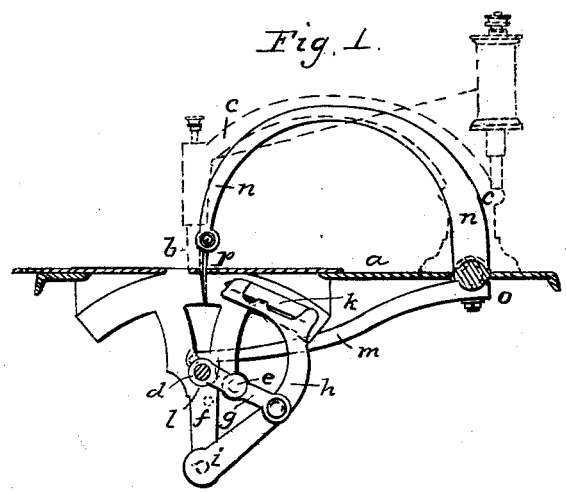
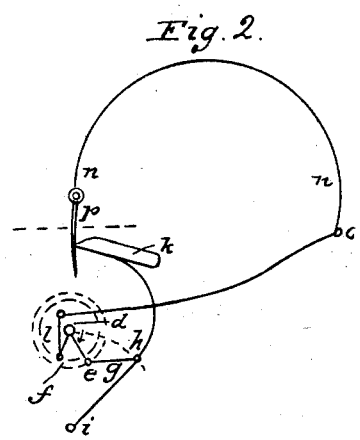
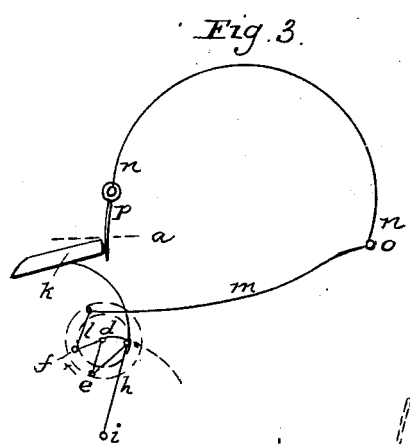
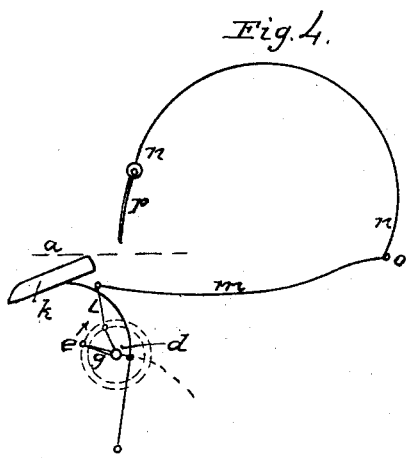
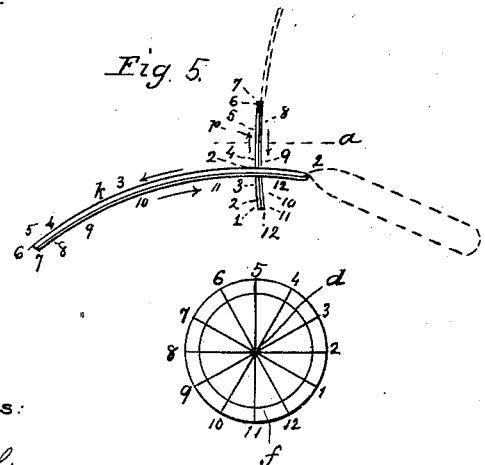
Witnesses:
Inventor:

UNITED STATES PATENT OFFICE.

E. HARRY SMITH, OF NEW YORK, N. Y.

IMPROVEMENT IN SEWING-MACHINES.

Specification forming part of Letters Patent No. 20,175, dated May 4, 1858.

*To all whom it may concern:*

Be it known that I, E. HARRY SMITH, of the city, county, and State of New York, have invented, made, and applied to use certain new and useful Improvements in Sewing-Machines; and I do hereby declare that the following is a full, clear, and exact description of the nature of my said invention, reference being had to the annexed drawings, making part of this specification, wherein—

Figure 1 is an elevation of my sewing-machine with the bed in section longitudinally at the opening for the needle. Figs. 2, 3, and 4 are diagrams representing the relative positions of the needle, shuttle, and other parts at different points of the movement; and Fig. 5 shows in full size the relative positions of the needle-eye and point of the shuttle at various points in the revolution of the main shaft.

Similar marks of reference indicate the same parts.

In all sewing-machines with which I am acquainted the shuttle and needle have either a direct and uniform reciprocating movement, and simultaneously pause and commence to move in the opposite direction, or else the shuttle or the needle, or both, are made to pause at certain points of their movement for the other instrument to operate—that is to say, the movement of the needle is momentarily arrested while the shuttle travels through the loop, or else the movement of the shuttle ceases during a part of the needle's movement, or both. If the needle and shuttle have continuous movements, as first above indicated, and these movements take place in unison, as in the machines of I. B. Woodruff, patented July 3d, 1855, and C. A. Durgin, patented May 22, 1855, the shuttle, traveling through the loop at about the speed of the rising needle, produces such a large loop of thread around the said shuttle that an additional amount of motion on the needle is required to pull up said slack thread, involving the necessity of large movements to both needle and shuttle, because the shuttle has to travel generally about twice its length to obtain sufficient speed to pass through the loop in proper time, and considerable slack thread is formed that is difficult to control, so as to admit of a high speed. If the shuttle or needle, or both, during a portion of their stroke have a complete rest or cessation of motion, as in the machine of I. M. Singer, November 4, 1856, the inertia of the parts produces a blow, and that involves considerable noise as well as injury to the parts, and prevents the machine from running smoothly and with little noise and wear, especially where a high rate of speed is required. It is therefore desirable to have smooth, noiseless movements, as they possess many advantages in their non-liability to wear, their ease of motion, their capability of being run at a high speed, &c., while at the same time it is also desirable, and, in fact, requisite, that the respective movements are performed in proper time with regard to each other without incurring a greater extent of motion than is required for the performance of their respective functions in the operation of sewing, for reasons before enumerated.

The nature of my invention consists in arranging cranks and connections therefrom to the needle and shuttle in such a manner that the shuttle is caused to move through the loop with accelerated velocity while the needle is retarded, and then the needle receives an accelerated movement while the shuttle is retarded. By these accelerations and retardations I am enabled to produce the proper relations of the movements of the needle and shuttle with respect to each other without the necessity of arresting either of the movements, as now practiced, as before mentioned, while the machine is rendered almost noiseless in its operation, the parts do not receive any concussion, and are durable. No more motion is given either to the needle or the shuttle than is required for the machines in which a complete rest or cessation of movement is made use of, and the long needle and extent of movement required by the machines in which the needle and shuttle move in unison is avoided, the risk of breaking the thread or entangling the same is prevented, and a higher speed can be attained.

To enable others to make and use my said invention, I will proceed to describe the manner in which I attain the desired relative movements of the needle and shuttle by my arrangement of cranks and connections to the needle and shuttle.

In the drawings, Fig. 1, *a* is the bed of the machine, carrying the parts, and may be provided with a pressure-pad or other device, *b*, on an arm, *c*, as shown by dotted lines, to hold down the cloth in any usual manner.

*d* is the main shaft, rotated by competent power in the direction of the arrow. This shaft is provided with two cranks or crank-pins, *e f*.

*g* is a connecting-rod from the crank-pin *e* to the arm *h* of the shuttle-carrier. This rod *g* is a little longer than the radius described by the crank-pin *e*. The arm *h* is on a center, *i*, and carries at its other end the shuttle *k*.

*l* is a rod connecting the crank-pin *f* to the lever *m* of the needle-arm *n*. This connecting-rod *l* is slightly longer than the radius described by the crank-pin *f*. The needle-arm *n* is set on a fulcrum, *o*, and carries the needle *p*.

In Figs. 1, 2, 3, and 4 the positions of the different parts with respect to each other are shown in the relation which the parts sustain relatively with different points in the rotation of the main shaft. In Fig. 1 the shuttle is at the end of its return-stroke, the needle is fully in the cloth, and has just commenced to rise. It will be observed that the commencement of these movements is not simultaneous. In Fig. 2 the shuttle is about to enter the loop, and now has its movement considerably accelerated, while the needle's movement is at the same time retarded. This continues until the parts arrive at the position shown in Fig. 3. It will be observed that the shuttle has now traveled a distance of more than its entire length, and yet such is the difference between its speed and that of the needle that the latter has moved a distance scarcely exceeding the diameter of the shuttle. In Fig. 3 the shuttle, having passed through the loop, its movement is retarded, while at the same time that of the needle is accelerated, and the latter draws the loop from the heel of the shuttle. From this time until the parts assume the position shown in Fig. 4, the shuttle moves but very little, while the needle performs its greatest extent of motion. The shuttle is then driven back and the needle descends, and the parts assume the position shown in Fig. 1, when the same movements are repeated.

By reference to Fig. 5 the relative movements of both needle and shuttle throughout their reciprocations will be apparent. The red lines show the lines of travel of the needle-eye and shuttle-point; and when the crank-pin *e* is in the position shown by the small figures 1 the needle-eye and shuttle-point will occupy the position shown by the corresponding numbers adjoining the red lines.

If the main shaft *d* be turned one-twelfth of a revolution, so as to bring the point 2 to the position 1, the position of the needle-eye and shuttle-point will be seen by the corresponding numbers, 2 2, and so on through the whole revolution of the main shaft. Thus it will be seen that while I have a continuous reciprocating movement and obtain all the advantages consequent thereon, I also produce a retardation of the movement of the needle while in the cloth, (from 1 to 4,) while the shuttle's movement is accelerated as it passes through the loop, and then produce an accelerated movement on the needle (from 4 to 7) to draw up the loop while the shuttle is retarded, after which the needle and shuttle travel back to the place of beginning.

What I claim as my invention, and desire to secure by Letters Patent, is—

Arranging the cranks and connections to the needle and shuttle in substantially the manner set forth, whereby the differential movements specified are imparted to the needle and shuttle in the alternating manner described.

E. HARRY SMITH.

Witnesses:
  LEMUEL W. SERRELL,
  THOMAS G. HAROLD.